(12) United States Patent
Gilsdorf et al.

(10) Patent No.: US 7,313,151 B2
(45) Date of Patent: Dec. 25, 2007

(54) EXTENDIBLE ASYNCHRONOUS AND SYNCHRONOUS INTERFACE BUS FOR BROADBAND ACCESS

(75) Inventors: John F. Gilsdorf, Derby, CT (US); Yung-Yuan Yang, Ansonia, CT (US)

(73) Assignee: Transwitch Corporation, Shelton, CT (US)

( * ) Notice: Subject to any disclaimer, the term of this patent is extended or adjusted under 35 U.S.C. 154(b) by 940 days.

(21) Appl. No.: 10/072,329

(22) Filed: Feb. 6, 2002

(65) Prior Publication Data

US 2003/0147416 A1 Aug. 7, 2003

(51) Int. Cl.
*H04L 12/40* (2006.01)
(52) U.S. Cl. .................... 370/438; 370/439
(58) Field of Classification Search ........ 370/394, 370/438–439, 422–423, 463, 466–467, 358, 370/460–465, 360–365
See application file for complete search history.

(56) References Cited

U.S. PATENT DOCUMENTS

| | | | |
|---|---|---|---|
| 3,982,077 A | 9/1976 | Clark et al. ............. 179/15 |
| 3,985,962 A | 10/1976 | Jones et al. ............ 179/15 |
| 4,149,144 A | 4/1979 | Diefender ............ 340/147 R |
| 4,156,798 A | 5/1979 | Doelz ................ 179/15 AL |
| 4,375,681 A | 3/1983 | Abbott et al. .......... 370/16 |
| 4,460,993 A | 7/1984 | Hampton et al. ....... 370/84 |
| 4,488,293 A | 12/1984 | Haussmann et al. ..... 370/84 |
| 4,535,448 A * | 8/1985 | Baxter et al. .......... 370/364 |
| 4,660,169 A | 4/1987 | Norgren et al. ........ 364/900 |
| 4,685,101 A | 8/1987 | Segal et al. ........... 370/84 |
| 4,727,536 A | 2/1988 | Reeves et al. ......... 370/84 |
| 4,750,168 A | 6/1988 | Trevitt ................ 370/85 |
| 4,763,320 A | 8/1988 | Rudolph et al. ........ 370/85 |
| 4,789,926 A | 12/1988 | Clarke ................ 364/200 |
| 4,815,074 A | 3/1989 | Jacobsen .............. 370/112 |
| 4,817,037 A | 3/1989 | Hoffman et al. ....... 364/200 |
| 5,048,012 A | 9/1991 | Gulick et al. .......... 370/77 |
| 5,084,872 A | 1/1992 | Le Cucq et al. ....... 370/94.4 |
| 5,150,359 A * | 9/1992 | Wilson et al. ......... 370/438 |
| 5,163,048 A | 11/1992 | Heutink .............. 370/85.6 |
| 5,172,373 A | 12/1992 | Suzuki .............. 370/85.11 |
| 5,263,023 A | 11/1993 | Sevenhans et al. .... 370/85.11 |
| 5,276,678 A | 1/1994 | Hendrickson et al. .... 370/62 |
| 5,299,193 A | 3/1994 | Szczepanek ......... 370/85.1 |
| 5,339,395 A * | 8/1994 | Pickett et al. ........... 710/305 |
| 5,452,330 A | 9/1995 | Goldstein ............ 375/257 |
| 5,546,392 A * | 8/1996 | Boal et al. ........... 370/458 |

(Continued)

*Primary Examiner*—Wing Chan
*Assistant Examiner*—Mark A. Mais
(74) *Attorney, Agent, or Firm*—Gordon & Jacobson, PC

(57) ABSTRACT

Apparatus for simultaneously transferring synchronous and asynchronous signals among broadband access devices includes a data bus, a clock bus, and a plurality of control lines which are used to indicate the type of data being carried on the bus. According to the methods of the invention, data is transferred on the bus in a repeating frame having a plurality of slots, each slot being defined as one bus clock cycle. Each slot may contain a synchronous or asynchronous data signal and one or more of the control lines are asserted during the slot time of the data to indicate the type of data. Two embodiments are provided. One utilizes a 25 MHz clock bus and a repeating frame of three hundred thirty-six slots. The other utilizes a 75 MHz clock bus and a repeating frame of one thousand eight slots.

15 Claims, 3 Drawing Sheets

U.S. PATENT DOCUMENTS

| | | | |
|---|---|---|---|
| 5,572,686 A | 11/1996 | Nunziata et al. | 395/296 |
| 5,901,146 A * | 5/1999 | Upp | 370/389 |
| 6,104,724 A * | 8/2000 | Upp | 370/458 |
| 6,119,188 A * | 9/2000 | Sheafor et al. | 710/107 |
| 6,240,087 B1 * | 5/2001 | Cummings et al. | 370/360 |
| 6,275,499 B1 * | 8/2001 | Wynn et al. | 370/438 |
| 6,414,966 B1 * | 7/2002 | Kulkarni et al. | 370/465 |
| 6,457,090 B1 * | 9/2002 | Young | 710/313 |
| 6,535,520 B1 * | 3/2003 | Hann et al. | 370/461 |
| 6,667,973 B1 * | 12/2003 | Gorshe et al. | 370/376 |
| 6,724,772 B1 * | 4/2004 | Borland et al. | 370/442 |
| 6,768,745 B1 * | 7/2004 | Gorshe et al. | 370/421 |
| 6,996,125 B2 * | 2/2006 | Kfir et al. | 370/466 |

* cited by examiner

FIG. 2

EXTENDIBLE ASYNCHRONOUS AND SYNCHRONOUS INTERFACE BUS FOR BROADBAND ACCESS

BACKGROUND OF THE INVENTION

1. Field of the Invention

The invention relates to telecommunications. More particularly, the invention relates to a communications interface bus which can carry synchronous and asynchronous data signals simultaneously.

2. State of the Art

The first commercial digital voice communications system was installed in 1962 in Chicago, Ill. The system was called "T1" and was based on the time division multiplexing (TDM) of twenty-four telephone calls on two twisted wire pairs. The T1 system is still widely used today and forms a basic building block for higher capacity communication systems including T3 which transports twenty-eight T1 signals. The designations T1 and T3 were originally coined to describe a particular type of carrier equipment. Today T1 and T3 are often used to refer to a carrier system, a data rate, and various multiplexing and framing conventions. It is more accurate to use the designations "DS1" and "DS3" when referring to the multiplexed digital signal carried by the T1 and T3 carriers, respectively.

Today, another higher bandwidth TDM system is in use. This system is referred to as the synchronous optical network (SONET) or, in Europe, the synchronous digital hierarchy (SDH). The SONET network is designed to provide enormous bandwidth. SONET signals are referred to as Synchronous Transport Signals (STS) or Optical Carriers (OC). The narrowest SONET signal is referred to as STS-1 or OC-1. It has a bandwidth of 51.84 Mb/s which is sufficient to carry twenty-eight DS1 signals or a single DS3 signal. The hierarchy includes STS-3 (OC-3) which is three times the bandwidth of an STS-1 (OC-1) signal, and higher bandwidth signals increasing in multiples of four, i.e. STS-12 (OC-12), STS-48 (OC-48), STS-192 (OC-192), and STS-768 (OC-768).

SONET signals are said to be synchronous because all nodes in the SONET network are synchronized to a common reference clock. The older T-1 and T-3 signals are said to be plesiochronous (nearly synchronous) because the clock rate of each signal is tightly controlled. As used herein, however, all signals other than SONET signals are referred to as asynchronous. When multiple T-1 or T-3 signals from different sources are demultiplexed from a SONET signal, each of these plesiochronous signals will have its own separate clock. The clock for each signal is derived from the SONET signal using a desynchronizer. For example, when demultiplexing an STS-1 signal which carries twenty-eight DS-1 data signals, twenty-eight desynchronizers will be used to create twenty-eight separate clock signals, one for each DS-1 signal. In fact, each DS-1 signal will have its own clock, data, and frame signals.

As telecommunication networks grow, it is desirable to miniaturize network equipment as much as possible, particularly in urban areas where space is expensive and networks are large. For example, a SONET demultiplexer may be made of a few integrated circuit chips. One of the difficulties in miniaturization is that as more devices are placed on a single chip, more leads or pins are required. The physical size of the chip limits the number of leads which can be used. For example, in a SONET demultiplexer, it would be necessary to provide three pins (clock, data, and frame) for each "possible" asynchronous signal. By "possible", it is meant that in a higher order SONET signal, such as an STS-3, demultiplexing may involve separating out twenty-eight DS-1 signals and two STS-1 signals or it could involve separating out up to eighty-four DS-1 signals. Thus, a demultiplexing solution for an STS-3 would require eighty-four data lines, eight-four clock lines, and eight-four frame signal lines in order to terminate eighty-four DS-1 signals. This would require many separate pins on a chip.

SUMMARY OF THE INVENTION

It is therefore an object of the invention to provide methods and apparatus for simultaneously transferring synchronous and asynchronous signals among broadband access devices.

It is also an object of the invention to provide methods and apparatus for efficiently transferring synchronous and asynchronous signals among broadband access devices.

It is another object of the invention to provide methods and apparatus for transferring synchronous and asynchronous signals among broadband access devices using a minimum number of lines.

In accord with these objects which will be discussed in detail below, the apparatus of present invention provides a bus which includes a data bus, a clock bus, and a plurality of control lines which are used to indicate the type of data being carried on the data bus. According to the methods of the invention, data is transferred on the bus in a repeating frame having a plurality of slots, each slot being defined as one bus clock cycle. Each slot may contain a synchronous or asynchronous data signal and one or more of the control lines are asserted during the slot time of the data to indicate the type of data.

Two embodiments are provided. One utilizes a 25 MHz clock bus and a repeating frame of three hundred thirty-six slots. The other utilizes a 75 MHz clock bus and a repeating frame of one thousand eight slots. In the first embodiment, data is interleaved in groups of four and in the second embodiment data is interleaved in groups of twelve. The first embodiment supports up to four STS-1 payloads or combinations of other signals totalling the same bandwidth. The second embodiment supports up to twelve STS-1 signals or combinations of other signals totalling the same bandwidth.

The presently preferred embodiment of the data bus includes eight receive bits and eight transmit bits. The control lines include RxIFSlot, TxIFSlot, RxValid, TxValid, RxFrm_ind, TxFrm_ind, RxFrm_pos2-0, TxFrm_pos2-0, RxPrty, TxPrty2, and TxPrty1. RxIFSlot (for the receive bus) and TxIFSlot (for the transmit bus) are used to mark the first bus slot. They are asserted low once every three hundred thirty-six time slots (one thousand eight for the second embodiment). RxValid indicates the presence of a valid data byte on the receive bus when it is asserted low. TxValid indicates that the data byte on the transmit bus is requested when it is asserted low. RxFrm_ind and TxFrm_ind indicate the start of frame (not to be confused with the repeating frame of the invention) of an asynchronous signal such as a T-1, etc. RxFrm_pos2-0 and TxFrm_pos2-0 indicate the frame pulse position within a byte when RxFr_ind, respectively TxFr_ind, is asserted. A value of 111 indicates the MSB and 000 indicates the LSB. RxPrty, TxPrty2, and TxPrty1 are parity bits which provide even parity over all (or some, depending on mode of operation) the other control and data signals.

The invention is implemented in conjunction with an optical network interface which is designated the sender and an interface to another network, e.g. an interface to a router, which is designated a receiver. The bus system according to the invention is operable with multiple senders and receivers. It is therefore applicable to an add/drop node of the optical network as well as to an end point node.

Additional objects and advantages of the invention, including the details of multiplexing synchronous and asynchronous signals in both the first and second embodiment will become apparent to those skilled in the art upon reference to the detailed description taken in conjunction with the provided Appendix.

BRIEF DESCRIPTION OF THE DRAWINGS

FIG. 2 is a diagram of the repeating frame of a first embodiment of the invention.

BRIEF DESCRIPTION OF THE APPENDIX

The attached sixty-six page Appendix is a document entitled Extendible Asynchronous and Synchronous Interface (EASI) Bus for Broadband Access-Functional Requirements which includes numerous figures, tables and timing diagrams illustrating operation of the invention.

DETAILED DESCRIPTION OF THE PREFERRED EMBODIMENTS

Figure 1:
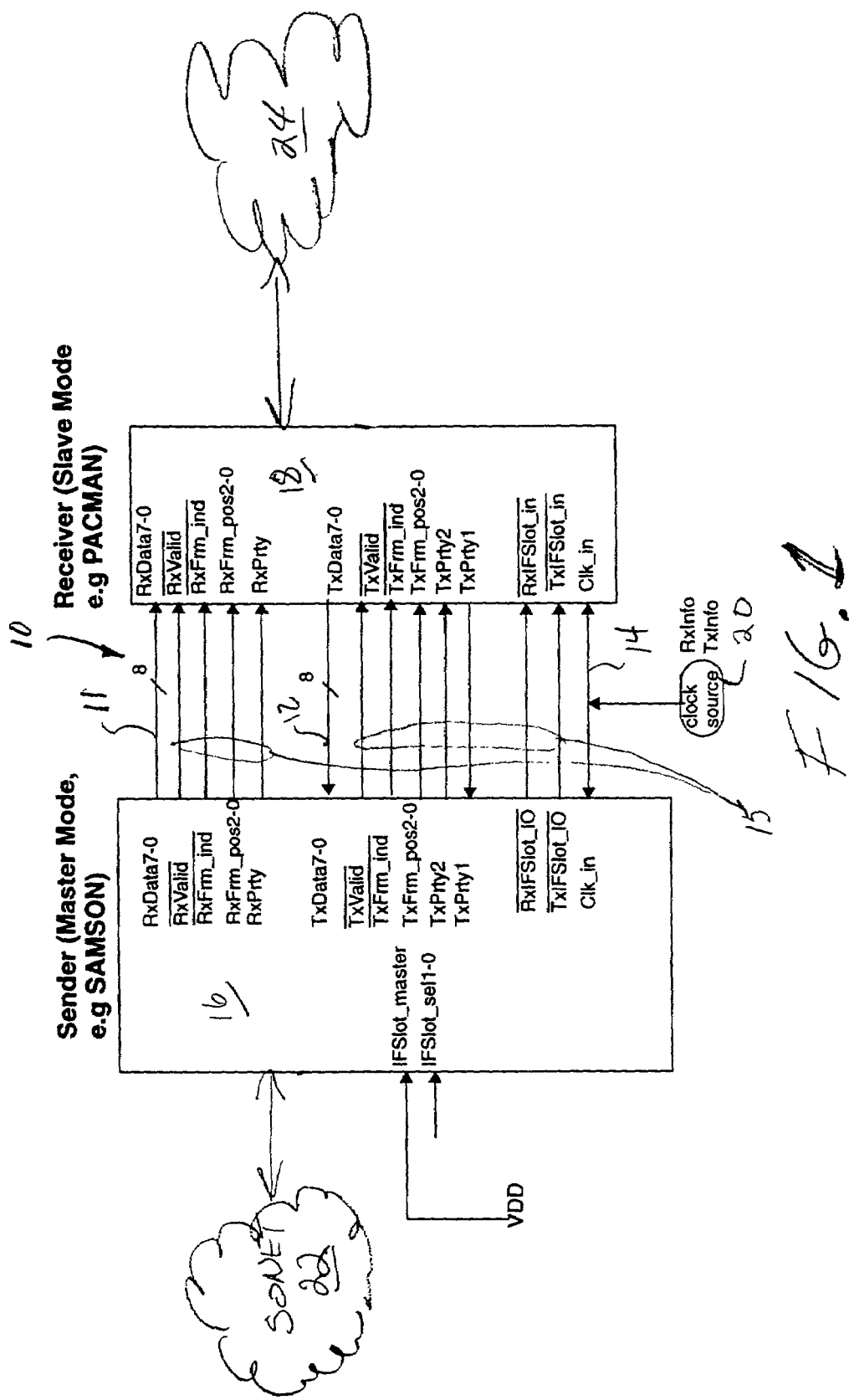
FIG. 1 is a simplified block diagram of a simple embodiment of the apparatus according to the invention showing two devices coupled to a bus.

Turning now to FIG. 1, the apparatus of present invention provides a bus 10 which includes a receive (Rx) data bus 11, a transmit (Tx) data bus 12, a clock bus 14, and a plurality of control lines 15 which are used to indicate the type of data being carried on the Rx and Tx data buses. The presently preferred embodiment of the Rx bus 11 includes eight receive bits and the Tx bus 12 eight transmit bits. The control lines include RxIFSlot, TxIFSlot, RxValid, TxValid, RxFr_ind, TxFrm_ind, RxFrm_pos2-0, TxFrm_pos2-0, RxPrty, TxPrty2, and TxPrty1. As shown in FIG. 1, a first device (bus user) 16 is coupled to a second device (bus user) 18 via the bus 10; i.e. the data buses 11, 12, the clock bus 14, and the control lines 15. The clock bus 14 is coupled to a clock source 20.

According to the invention, the first device 16 is coupled via a standard SONET interface (not shown) to an optical network 22 and is considered to be a "Sender". The second device 18 is coupled to a non-SONET network 24 via an ETHERNET or other non-SONET interface (not shown) and is considered to be a "Receiver". Details concerning the Sender are set out in the attached Appendix at pages 28-38 and 55-62. Details concerning the Receiver are set out in the Appendix at pages 19-28 and 50-55.

As used herein, the terms Sender and Receiver are not the same as the terms Master and Slave which are often used to describe devices coupled to a bus. According to the invention, either the Sender or the Receiver can act as bus Master. Appendix pages 50-62 include timing diagrams illustrating the Sender and Receiver operating in both Master Mode and Slave Mode.

Before discussing the operation of the apparatus and in particular, the operation of the control lines, it is useful to first understand the repeating frame by which data is transferred over the bus.

Figure 2:
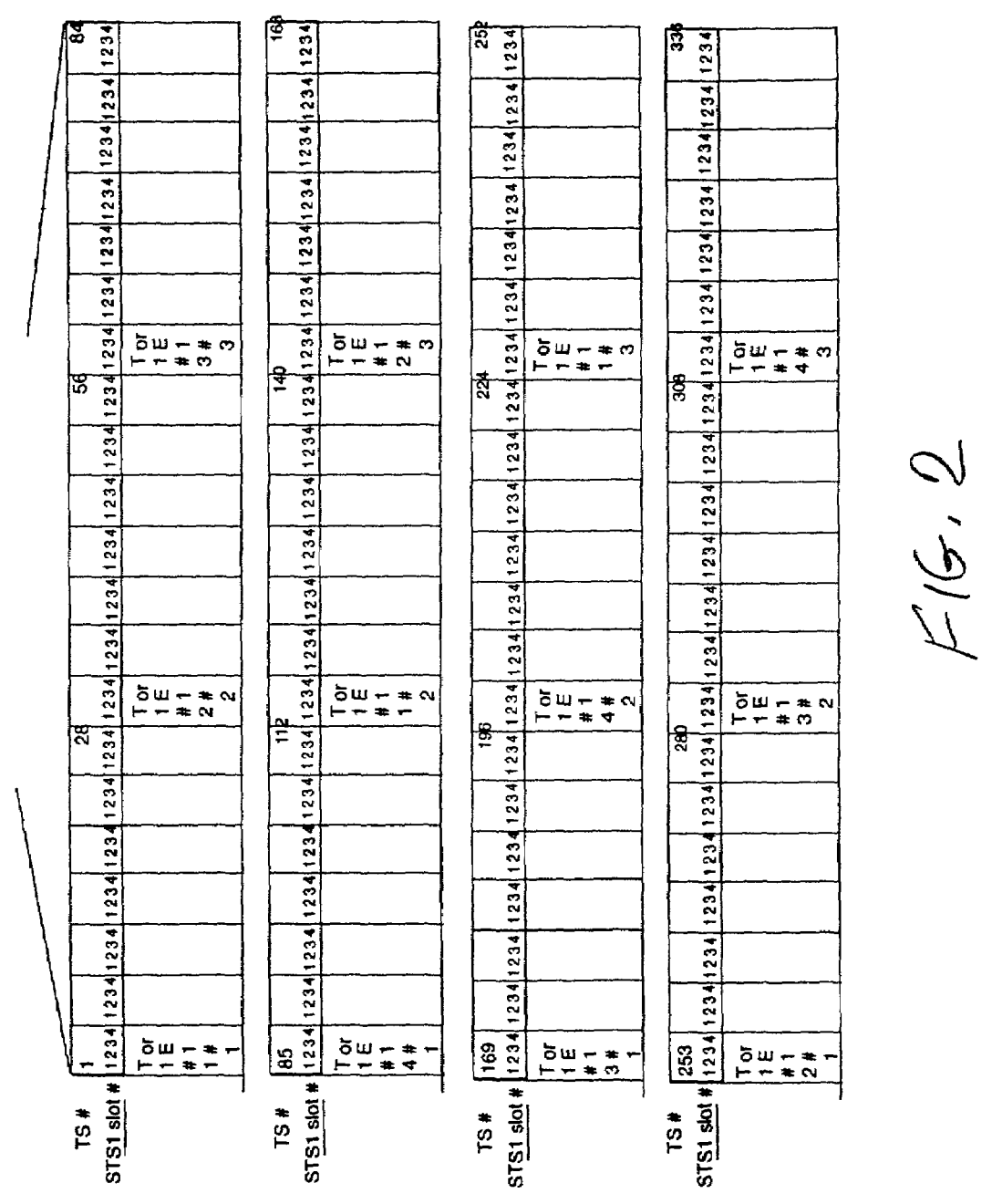

Turning now to FIG. 2, according to a first embodiment of the invention which operates at a bus speed of 25 MHz, the frame has three hundred thirty-six time slots. Data is interleaved in groups of four slots which corresponds to the STS-1 slot interleave scheme. The first embodiment supports the transfer from the optical network 22 to the non-optical network 24 (or vice versa) up to four STS-1 payloads or combinations of other signals totalling the same bandwidth. Examples of the types of signals which can be mapped into the frame are illustrated in the attached Appendix at pages 7-14.

A second embodiment of the invention is shown in the attached Appendix at pages 40-49. The second embodiment operates at a bus speed of 75 MHz and uses a repeating frame of one thousand eight slots. In the second embodiment data is interleaved in groups of twelve. The second embodiment supports the transfer of up to twelve STS-1 signals or combinations of other signals totalling the same bandwidth. Examples of the types of signals which can be mapped into the frame of the second embodiment are illustrated in the attached Appendix at pages 44-49.

Referring now to FIGS. 1 and 2, the signals RxIFSlot (for the receive bus) and TxIFSlot (for the transmit bus) are used to mark the first slot in the frame. They are asserted low once every three hundred thirty-six slots for the first embodiment and once every one thousand eight slots for the second embodiment.

RxValid indicates the presence of a valid data byte on the receive bus when it is asserted low.

TxValid indicates that the data byte on the transmit bus is requested (or that it is being sent depending on the mode of operation) when it is asserted low.

The RxValid and TxValid signals are used to indicate when no data is available in an asynchronous signal.

RxFrm_ind and TxFrm_ind indicate the start of frame (not to be confused with the repeating frame of the invention) of an asynchronous signal such as a T-1, E-1 etc.

RxFrm_pos2-0 and TxFrm_pos2-0 indicate the frame pulse position within a byte when RxFrm_ind, respectively TxFrm_ind is asserted. A value of 111 indicates the MSB and 000 indicates the LSB.

RxPrty, TxPrty2, and TxPrty1 are parity bits which provide even parity over all (or some, depending on mode of operation) the other control and data signals. Details regarding the parity bits can be found in the attached Appendix at pages 29 and 30.

Timing diagrams illustrating the operation of the Receiver in both master and slave mode are shown at pages 22 and 50 of the Appendix. Timing diagrams illustrating operation of the Receiver in slave mode are shown at pages 23 and 52 of the Appendix. Timing diagrams illustrating operation of the Receiver in master mode are shown at pages 25, 26 and 54 of the Appendix.

A timing diagram illustrating operation of the Sender in both master mode and slave mode is shown at page 56 of the Appendix. Timing diagrams illustrating operation of the Sender in master mode are shown at pages 32, 34, 35, 36, and 58 of the Appendix. Timing diagrams illustrating operations of the Sender in slave mode are shown at pages 37, 38, and 60 of the Appendix.

Figure 3:
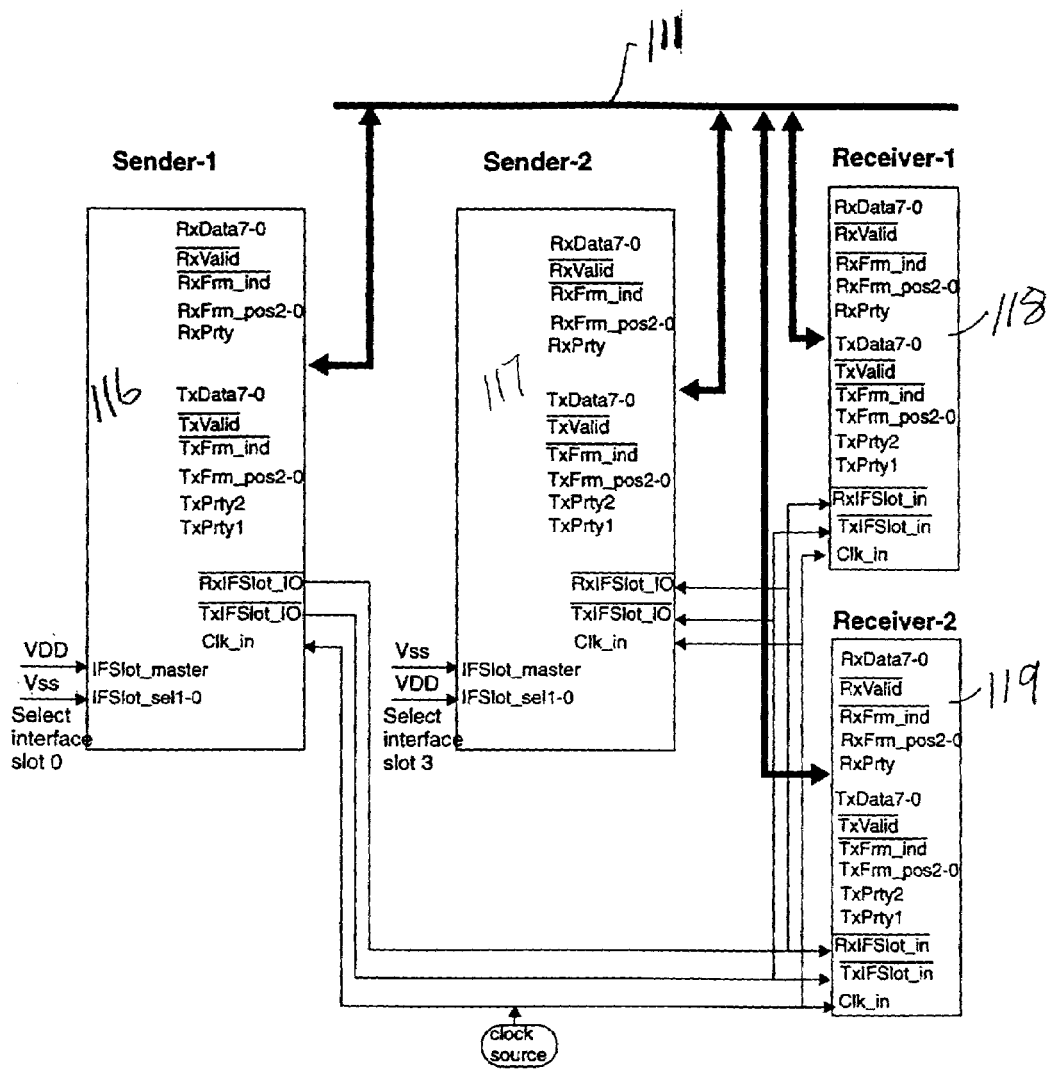
FIG. 3 is a block diagram similar to FIG. 1 but showing four devices coupled to the bus.

The bus of the invention is extensible. FIG. 3 illustrates a bus 110 coupled to two senders 116, 117 and two receivers 118, 119. In this example, the sender 116 operates in master mode and all of the other devices operate in slave mode.

There have been described and illustrated herein several embodiments of an extendible asynchronous and synchronous interface bus for broadband access. While particular embodiments of the invention have been described, it is not intended that the invention be limited thereto, as it is intended that the invention be as broad in scope as the art will allow and that the specification be read likewise. Thus, while particular combinations of synchronous and asynchronous signals have been shown in the Appendix, it will be appreciated that other combinations could be utilized. Also, while the bus has been illustrated with one sender with one receiver, one sender with two receivers, and two senders with two receivers, it will be recognized that other combinations of senders and receivers could be used. It will therefore be appreciated by those skilled in the art that yet other modifications could be made to the provided invention without deviating from its spirit and scope as so claimed.

The invention claimed is:

1. A system for transferring synchronous and asynchronous signals between broadband access devices, said system comprising:
   a) at least two bus users;
   b) a data bus coupled to said at least two bus users;
   c) a clock bus coupled to said at least two bus users; and
   d) at least one control line coupled to said at least two bus users, wherein
      data is transferred between said at least two bus users over said data bus according to a repeating bus frame having a plurality of slots, at least some of said plurality of slots being associated with asynchronous data streams and said at least one control line being asserted when and only when valid data from one of said asynchronous data streams appears on said data bus in a slot of said repeating bus frame.

2. A system according to claim 1, wherein:
said repeating bus frame has three hundred thirty-six slots and said clock bus provides a clock signal of approximately 25 MHz.

3. A system according to claim 1, wherein:
said repeating bus frame has one thousand eight slots and said clock bus provides a clock signal of approximately 75 MHz.

4. A system according to claim 1, wherein:
said at least one control line includes a start of frame indicator which is asserted at the first slot of said repeating bus frame.

5. A system according to claim 1, wherein:
at least one of said asynchronous data streams includes a repeating data frame, and
said at least one control line includes a data frame indicator which is asserted when a slot in said repeating bus frame includes a start of frame indicator for said repeating data frame.

6. A system according to claim 5, wherein:
said data bus transfers data eight bits at a time,
said start of frame indicator for said repeating data frame is one bit, and
said at least one control line includes a position indicator for indicating which of said eight bits is said one bit when said data frame indicator is asserted.

7. A system according to claim 1, wherein:
one of said at least two bus users is coupled to a SONET network and another of said at least two bus users is coupled to a non-SONET network.

8. A system according to claim 7, wherein:
said bus user coupled to the SONET network is a bus master.

9. A system according to claim 7, wherein:
said bus user coupled to the non-SONET network is a bus master.

10. A method for transferring synchronous and asynchronous signals between broadband access devices, said method comprising:
   a) generating a repeating bus frame having a plurality of slots;
   b) associating at least some of said slots with asynchronous data streams;
   c) transferring data between the broadband access devices on a data bus according to the repeating bus frame; and
   d) asserting a first control line when and only when valid data from one of the asynchronous data streams appears on the data bus in a slot of the repeating bus frame.

11. A method according to claim 10, wherein:
the repeating bus frame has three hundred thirty-six slots and repeats at a rate of approximately 25 MHz.

12. A method according to claim 10, wherein:
the repeating bus frame has one thousand eight slots and repeats at a rate of approximately 75 MHz.

13. A method according to claim 10, further comprising:
e) asserting a second control line at the first slot of the repeating bus frame.

14. A method according to claim 10, further comprising:
e) asserting a second control line when a slot of the repeating bus frame includes a framing signal of an asynchronous data stream.

15. A method according to claim 14, wherein:
each slot of the repeating bus frame has eight bits,
the framing signal of an asynchronous data stream is one bit, and
said step of asserting a second control line includes asserting a position indicator for indicating which of eight bits in the slot is the one bit framing signal.

* * * * *